March 12, 1935.    E. G. SPRUNG    1,993,865

WHEEL CARRIER

Filed Dec. 7, 1933

Inventor
Edwin G. Sprung
By Blackmore, Spencer & Flint
Attorneys

Patented Mar. 12, 1935

1,993,865

UNITED STATES PATENT OFFICE 1,993,865

WHEEL CARRIER

Edwin G. Sprung, Detroit, Mich., assignor to General Motors Corporation, Detroit, Mich., a corporation of Delaware Application December 7, 1933, Serial No. 701,275

2 Claims. (Cl. 224—29)

This invention relates to spare tire carriers for motor vehicles, and has for its object the provision of an improved fender well type of mounting for the extra wheel assembly.

It is here proposed to support the spare wheel at its hub on a mounting carried directly by the frame with a portion of the wheel extending into and being enclosed by a pocket formed in the front fender or mud guard. The tire support is particularly adapted for use with a relatively deep fender well and the portion which extends over the well for engagement with the wheel hub is so arranged that it can be swung out of the way when an extra wheel is to be placed in or removed from the well. Supporting the weight of the tire assembly directly on the frame relieves the fender of considerable load and strain, and because of the clearance provided, the use of tire covers for appearance purposes is facilitated.

Figure 1:
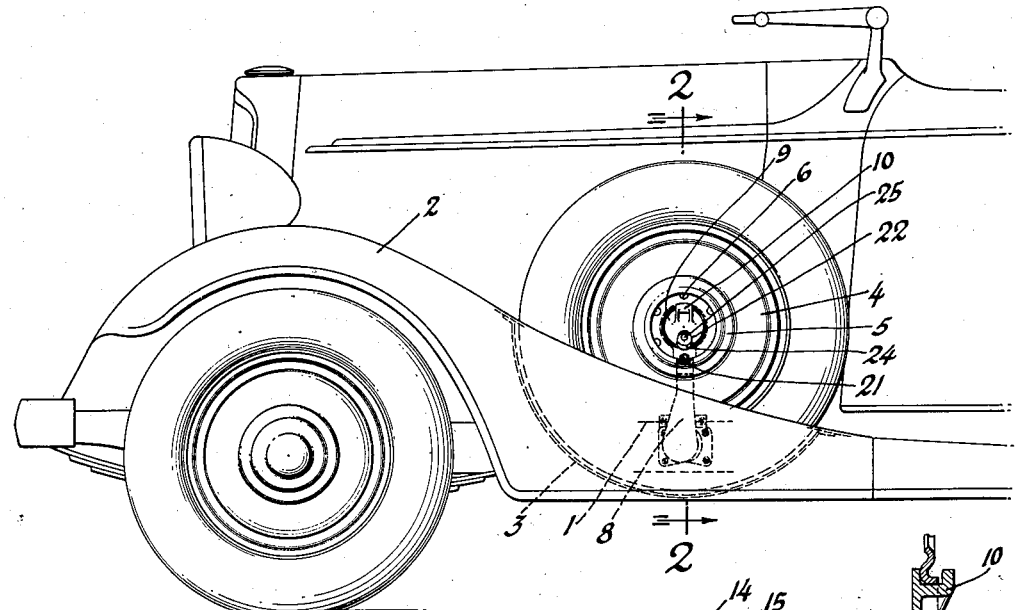
Figure 3:
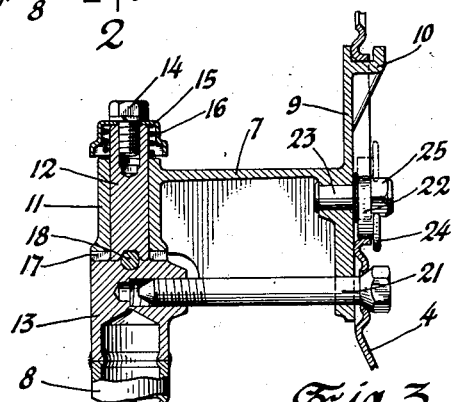
Figure 2:
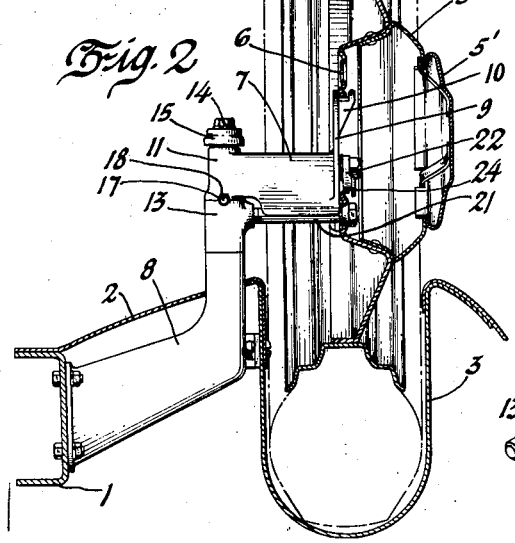
Figure 4:
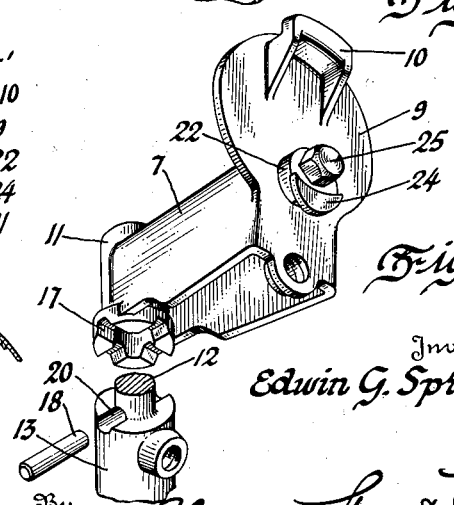

In the accompanying drawing, Figure 1 is a side elevation of a front part of a motor vehicle illustrating the application of the invention. Figure 2 is a transverse sectional view taken on line 2—2. Figure 3 is an enlarged fragmentary sectional view, and Figure 4 is a detail perspective view of the hub support.

Referring to the drawing, the numeral 1 indicates a longitudinal side member of the vehicle chassis frame which supports the fender 2, having a pocket or well 3 to the rear of the front wheel. The spare tire assembly shown within the well for illustrative purposes includes a removable disc wheel 4, having a hub 5 closed by a removable cap 5'. The center of the wheel is opened to receive the usual wheel spindle and carries a series of stud receiving openings 6 by which it is fastened to the axle spindle.

As shown in the drawing, the weight of the spare tire assembly is not placed upon the fender and instead there is provided a pair of relatively movable weight supporting members 7 and 8 mounted directly on the frame bar 1. The member 7 extends laterally over the fender well and carries at its outer end a face plate 9, having at its upper end an integral recessed boss 10 to project into the wheel opening and receive the edge of the wheel at said opening. At its opposite end the member 7 is provided with an eye or apertured head 11 receiving a trunnion stud 12 on the cap piece 13 of the bracket 8 and resting on a shoulder provided by the reduced stud portion 12.

A threaded bolt 14 at the upper end of the stud 12 retains in place a stamped cup 15, which encloses and seats a coiled compression spring 16 bearing on the end of the head 11 to hold it in engagement with the shouldered seat portion of the stud. To position the pivotally joined members 7 and 8 relative to each other, the underside of the head 11 may be provided with a pair of radial grooves 17 spaced 90° or at any other convenient angle, to receive a key or pin 18 fitted in a transverse opening 20 in the cap piece 13, so as to project slightly above the shouldered seat. Lifting the head slightly against the spring 16 allows the hub engaging member 7 to be swung on its stud 12 from the position illustrated in the drawing to beyond the vertical side lines of the fender well so as to eliminate obstruction at the well for the insertion and removal of the spare tire.

To clamp the spare wheel against the face plate 9 and also hold the hub engaging member 7 against accidental displacement, there is provided a relatively long bolt 21 which passes through one of the stud openings 6 in the wheel and through an alined opening in the plate 9, with its inner end screw threadedly engaged with an opening in the cap piece 13. For use either in conjunction with the clamping bolt 21 or as an optional device, there may be provided a cam 22 on the pivot stud 23 to engage with the inner edge of the spindle opening in the wheel at a point diametrically opposite that received within the boss 10. The cam is preferably provided with a retaining lip 24 and with a polygonal head 25 for engagement with a suitable operating tool.

To lock the parts against theft, any suitable means may be provided to prevent detachment of the wheel at its hub. For example, the removable hub cap 5' concealing the attachments may be locked against separation or else either or both the retaining means 21 and 25 may be enclosed within suitable lock casing units of a well known type. When the parts are so secured against theft, removal of the tire casing from the rim also will be precluded, inasmuch as the rim extends deep into the well and prevents the casing from being worked free.

I claim:

1. A spare wheel carrier for motor vehicles including in combination with a fender well, means to carry the entire weight of a spare wheel positioned within the well, said means comprising a fixed frame bracket extending upwardly at one side of the well and terminating in a trunnion stud which projects radially of the wheel axis, a laterally projecting wheel hub engaging arm having at one end a vertical plate extending across the central opening in the wheel hub with spaced seats for the hub and at its other end an apertured head sleeved upon said trunnion stud to provide a pivotal connection whereby the arm and end plate may be swung between positions within and outside the longitudinal side lines of the well, and a long stud adapted to extend parallel to the arm and through alined openings in the end plate and wheel hub with one end detachably engaged with the fixed frame bracket.

2. In combination, a fender well to receive a spare wheel assembly, a fixed frame bracket extending upwardly beside the well, a wheel hub engaging arm pivoted to said bracket for swinging movement about a vertical axis to positions inside and outside the vertical plane of the well, wheel supporting means on the free end of said swinging arm, and a long bolt extending in spaced substantially parallel relation to said arm and between the free end thereof and the fixed frame bracket and detachably connected to the fixed frame bracket and arm to hold the arm in wheel hub engaging position.

EDWIN G. SPRUNG.